United States Patent
Watanabe

(10) Patent No.: US 6,959,354 B2
(45) Date of Patent: Oct. 25, 2005

(54) EFFECTIVE BUS UTILIZATION USING MULTIPLE BUS INTERFACE CIRCUITS AND ARBITRATION LOGIC CIRCUIT

(75) Inventor: Hidekazu Watanabe, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 475 days.

(21) Appl. No.: 09/802,417

(22) Filed: Mar. 8, 2001

(65) Prior Publication Data

US 2002/0129184 A1 Sep. 12, 2002

(51) Int. Cl.⁷ .............................................. G06F 13/00
(52) U.S. Cl. ...................................... 710/309; 710/113
(58) Field of Search .............................. 710/300–315, 710/107–125, 36–45

(56) References Cited

U.S. PATENT DOCUMENTS

| | | | | | |
|---|---|---|---|---|---|
| 5,546,546 A | * | 8/1996 | Bell et al. | .................. | 710/112 |
| 5,619,661 A | * | 4/1997 | Crews et al. | ................. | 710/119 |
| 5,668,956 A | * | 9/1997 | Okazawa et al. | ............ | 710/306 |
| 5,675,751 A | * | 10/1997 | Baker et al. | ................. | 710/305 |
| 5,761,454 A | * | 6/1998 | Adusumilli et al. | ......... | 710/311 |
| 5,764,933 A | * | 6/1998 | Richardson et al. | ........ | 710/312 |
| 5,790,870 A | * | 8/1998 | Hausauer et al. | ........... | 710/260 |
| 5,941,968 A | * | 8/1999 | Mergard et al. | ............. | 710/308 |
| 6,070,205 A | * | 5/2000 | Kato et al. | ................... | 710/100 |
| 6,163,826 A | * | 12/2000 | Khan et al. | ................. | 710/107 |
| 6,175,889 B1 | * | 1/2001 | Olarig | ........................ | 710/309 |
| 6,260,093 B1 | * | 7/2001 | Gehman et al. | ............ | 710/309 |
| 6,516,378 B1 | * | 2/2003 | Yamashita et al. | .......... | 710/306 |
| 6,750,870 B2 | * | 6/2004 | Olarig | ........................ | 345/331 |
| 2002/0052999 A1 | * | 5/2002 | Jahnke et al. | ............... | 710/306 |

* cited by examiner

Primary Examiner—Glenn A. Auve
(74) Attorney, Agent, or Firm—Blakely, Sokoloff, Taylor & Zafman LLP

(57) ABSTRACT

In one embodiment of the present invention, a bus controller is used in a multi-bus system having first and second buses. The bus controller includes first and second bus interface circuits, a processor interface circuit, and an arbitration logic circuit. The first and second bus interface circuits interface to the first and second buses, respectively. The first bus is accessible to a first processor. The processor interface circuit interfaces to a second processor. The arbitration logic circuit is coupled to the first and second bus interface circuits and the processor interface circuit to arbitrate access requests from the first and second processors.

27 Claims, 4 Drawing Sheets

EFFECTIVE BUS UTILIZATION USING MULTIPLE BUS INTERFACE CIRCUITS AND ARBITRATION LOGIC CIRCUIT

BACKGROUND

1. Field of the Invention

This invention relates to computer architecture. In particular, the invention relates to multi-master systems.

2. Description of Related Art

In a typical microprocessor system, a common bus is used to interface to the central processing unit (CPU), program memory, data memory, peripheral devices, direct memory access (DMA) controller, and other bus masters or slaves. In this traditional single bus system, only one master can use the bus at a time.

One technique to improve bus utilization is cycle stealing. Cycle stealing allows a master to steals some cycles from another master that is controlling the bus. This technique avoids bus monopoly by a master. However, the technique is limited to the maximum bandwidth of a single bus and requires extra circuit to provide cycle stealing operations.

Therefore, there is a need to have a technique to provide efficient bus accesses in a multi-master system.

SUMMARY

The present invention is a method and apparatus to provide efficient bus accesses in a multi-bus system. In one embodiment of the present invention, a bus controller is used in a multi-bus system having first and second buses. The bus controller includes first and second bus interface circuits, a processor interface circuit, and an arbitration logic circuit. The first and second bus interface circuits interface to the first and second buses, respectively. The first bus is accessible to a first processor. The processor interface circuit interfaces to a second processor. The arbitration logic circuit is coupled to the first and second bus interface circuits and the processor interface circuit to arbitrate access requests from the first and second processors.

BRIEF DESCRIPTION OF THE DRAWINGS

The features and advantages of the present invention will become apparent from the following detailed description of the present invention in which.

DESCRIPTION

In the following description, for purposes of explanation, numerous details are set forth in order to provide a thorough understanding of the present invention. However, it will be apparent to one skilled in the art that these specific details are not required in order to practice the present invention. In other instances, well-known electrical structures and circuits are shown in block diagram form in order not to obscure the present invention.

Figure 1:
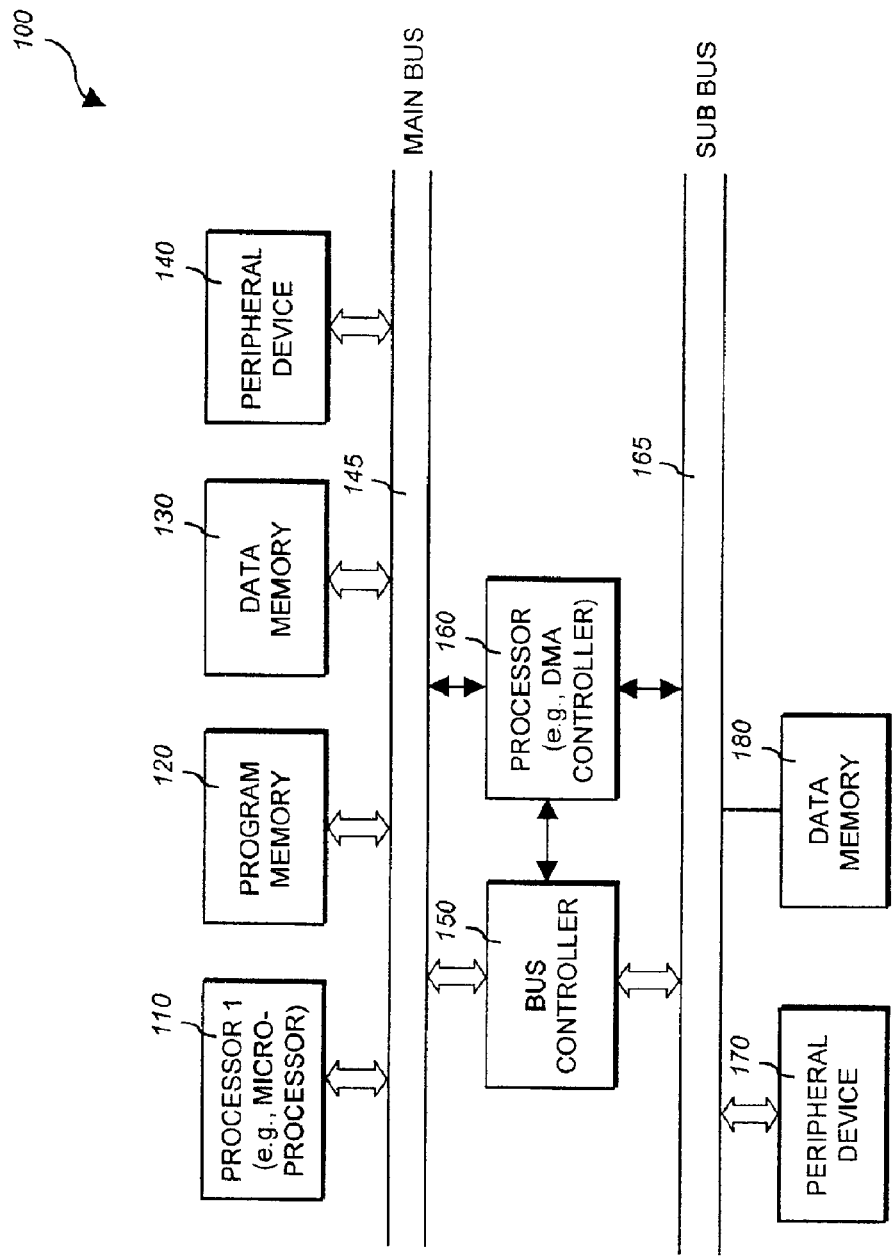
FIG. 1 is a diagram illustrating a system in which one embodiment of the invention can be practiced.

FIG. 1 is a diagram illustrating a system 100 in which one embodiment of the invention can be practiced. The system 100 includes a first processor 110, a program memory 120, a data memory 130, a peripheral device 140, a main bus 145, a bus controller 150, a second processor 160, a sub bus 165, a peripheral device 170, and a memory 180. As is known by one skilled in the art, any additional processors and/or devices and/or buses may be included.

The first and second processors 110 and 160 are any processors that have ability to control the corresponding bus. The ability to control the bus includes asserting mastership, issuing access control signals (e.g., read and write), issuing address and data, etc. A processor that can have control of a bus is referred to as a master. A device that can only receive information on the bus is referred to as a slave. Examples of the processors 110 and 160 include microprocessor, digital signal processor, micro-controller, direct memory access (DMA) controller, etc. Examples of a slave include memory devices, peripheral devices (e.g., serial communication, parallel input/output devices). In one embodiment, the first processor 110 is a microprocessor and the second processor 160 is a DMA controller.

The program memory 120 stores programs, functions, subprograms, or software modules to be executed by the first and/or second processors 110 and 160. The program memory 120 may be implemented as a random access memory (RAM), read only memory (ROM), programmable ROM, flash memory, or any type of memory that can be accessed by the first and/or second processors 110 and 160. The data memories 130 and 180 store data, records, messages, linked lists, structures, scratch data, or any type of information that can be used by the first and/or second processors 110 and 160. The data memory 130 may be implemented as a static or dynamic RAM, flash memory, or any type of memory that can be read and write. The peripheral devices 140 and 170 are any peripheral devices performing dedicated functions. Examples of the peripheral devices 140 and 170 include peripheral input/output (I/O) devices, network interface, printer controller, disk drive controller, media interface (e.g., graphics, audio, video), etc.

The main bus 145 is any bus compatible with the first and second processors 110 and 160. Examples of the main bus 145 include the Peripheral Interconnect Component (PCI) bus, the Industry Standard Adapter (ISA) bus, or any specially designed bus. The first and second processors 110 and 160, the program memory 120, the data memory 130, and the peripheral device are connected to the main bus 145. Through the main bus 145, the first processor 110 may fetch instructions from the program memory 120, execute the programs stored in the program memory 120, retrieve and/or write data from and/or to the data memory 130, and communicate with the peripheral device 140. The second processor 160 may also have access to the program memory 120, the data memory 130, and the peripheral device 140. The first and second processors 110 and 160 may have to compete for control of the bus 145. In one embodiment, there is communication protocol between the two processors 110 and 160 to allow resolving any conflicting requests. For example, when the first processor 110 is a microprocessor, or a central processing unit (CPU) in the system, and the second processor 160 is a DMA controller, there is typical a request and grant protocol between the two processors. Typically, when the DMA controller 160 wants to use the main bus 145, it may generate a request directly to the first processor 110 or through the bus controller 150. If the microprocessor 110 is ready to relinquish the main bus 145, it floats the bus drivers and then asserts a grant signal to the request. Upon receipt of the grant signal from the microprocessor 110 or the bus controller 150, the DMA controller 160 may begin access the main bus 145.

The bus controller 150 provides control the use of the main bus 145 and the sub bus 165. The bus controller 150 is coupled to the main bus 145, the sub bus 165, and the second processor 160. The bus controller 150 arbitrates access requests from the first and second processors 110 and 160. In one embodiment, the bus controller 150 acts as a bus separator to separate the main bus 145 and the sub bus 165 so that the first processor 110 can use the main bus 145 while the second processor 160 uses the sub bus 165.

As mentioned above, the second processor 160 is any processor that has ability to control the main bus 145 and the sub bus 165. The second processor 160 is connected to both the main bus 145 and the sub bus 165. The second processor 160 also has access to the bus controller 150. Typically, the second processor 160 send a command to the bus controller together with access information to request use of one of the buses 145 and 165. The second processor 160 can disconnect itself from the main bus 145 and/or the sub bus 165 when the first processor 110 is given control of the corresponding bus. The second processor 160 can access the program memory 120, the data memory 130, and the peripheral device 140 via the main bus 145. The second processor 160 can also access the peripheral device 170 and the memory 180 via the sub bus 165.

Figure 2A:
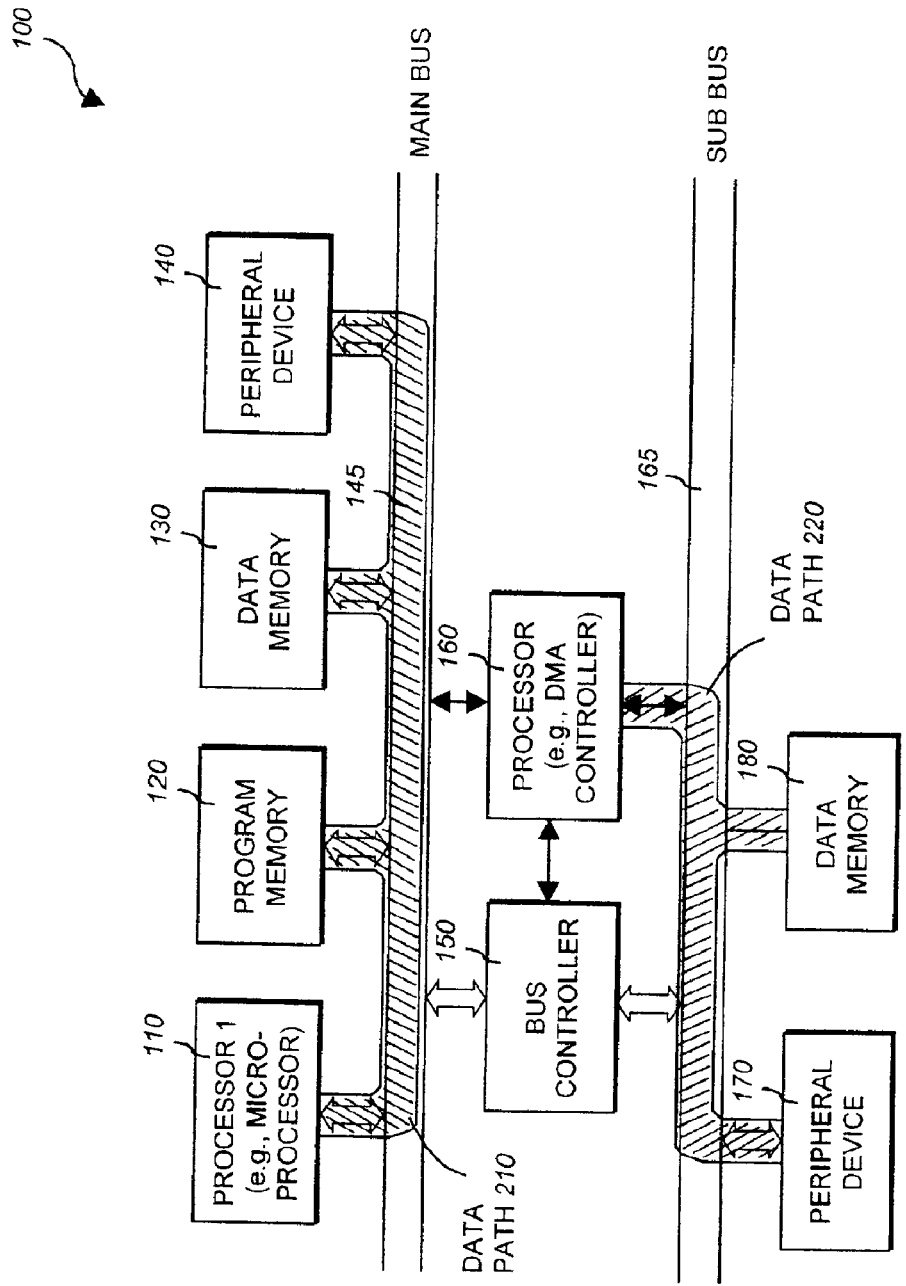
FIG. 2A is a diagram illustrating data flows for multiple accesses for the system shown in FIG. 1 according to one embodiment of the invention.

FIG. 2A is a diagram illustrating data flows for multiple accesses for the system shown in FIG. 1 according to one embodiment of the invention.

In this illustrative example, the first processor 110 is a microprocessor and the second processor 160 is a DMA controller. The first processor 110 accesses the program memory 120, the data memory 130, and the peripheral device 140 via the main bus 145. The first processor follows the data path 210. The second processor 160 accesses the peripheral device 170 and the data memory 180 via the sub bus 165. The second processor 160 performs a data transfer from the data memory 180 to the peripheral device 170. The second processor 160 follows data path 220.

The two data paths 210 and 220 are separate and independent. The second processor 160 first disables its interface to the main bus 145 and the sub bus 165. Then the processor 160 sends a command to the bus controller 150 containing a request to access the sub bus 165. The bus controller 150 arbitrates the request accesses from the first and second processors 110 and 160, and since the processor 110 does not request use of the sub bus 165, the access request from the processor 160 is granted. Once the access request is granted, the second processor 160 proceeds to carry out the data transfer by enabling the bus drivers at the interface to the sub bus 165.

In this illustrative example, the bus controller 150 acts like a bus separator that separates the two main and sub buses 145 and 165 so that the processors 110 and 160 can access the two respective buses concurrently. These concurrent accesses maximize the bus utilization and increase the efficiency of data transfers.

Figure 2B:
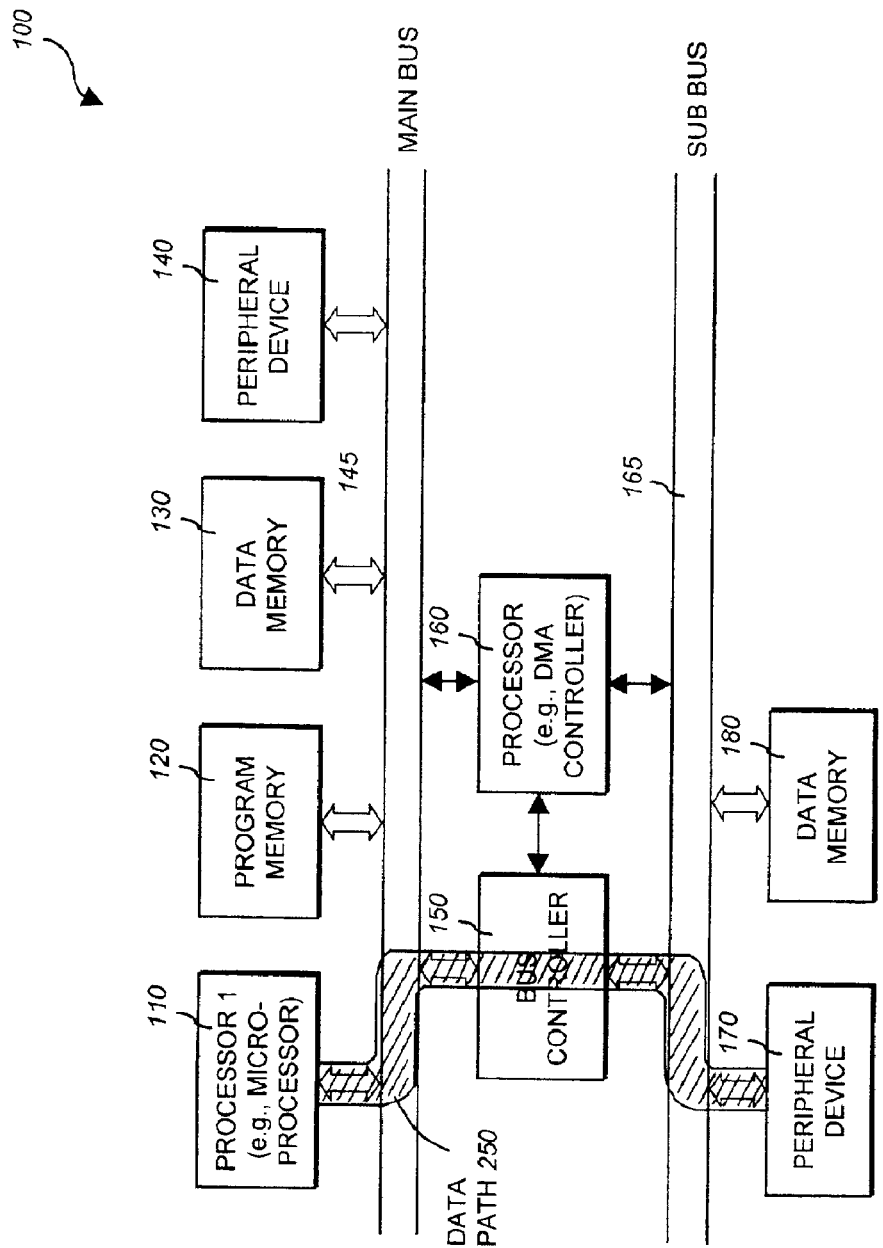
FIG. 2B is a diagram illustrating data flows for multiple accesses for the system shown in FIG. 1 according to one embodiment of the invention.

FIG. 2B is a diagram illustrating data flows for multiple accesses for the system shown in FIG. 1 according to one embodiment of the invention.

In this illustrative example, the first processor 110 wishes to access the peripheral device 170 via the main bus 145 and the sub bus 165. The first processor 110 sends an access request to the bus controller 150. Suppose the second processor 160 also wants to access the data memory 180.

The second processor sends a command to the bus controller 150 with an access request. The bus controller 150 arbitrates the two access requests from the processors 110 and 160. Suppose the bus controller 150 decides to grant the first processor 110 the access request based on some prioritization scheme. The bus controller 150 sends an access deny status to the second processor 160 and an access grant status to the first processor 110.

Upon receipt of the access denial, the second processor 160 disables the interface to the sub bus 165 and sends an acknowledgement to the bus controller 150. The second processor 160 may attempt to request access again after some predetermined time interval or after some random time interval depending on the protocol. During that time, the first processor 110 receives the access grant and proceeds to send out access information such as address and data. The first processor 110 follows a data path 230 to go through the main bus 145, the bus controller 150, the sub bus 165, and then the peripheral device 170. The bus controller 150 enables the interface to the main bus 145 and the interface to the sub bus 165 and passes the access information from the first processor 110 to the sub bus 165.

In this illustrative example, the bus controller 150 acts as a bus bridge to connect the main bus 145 to the sub bus 165. The main bus 145 and the sub bus 165 may or may not be the same. The bus controller 150 has interface circuits to match the main bus 145 to the sub bus 165 depending on the bus structure of these individual buses.

Figure 3:
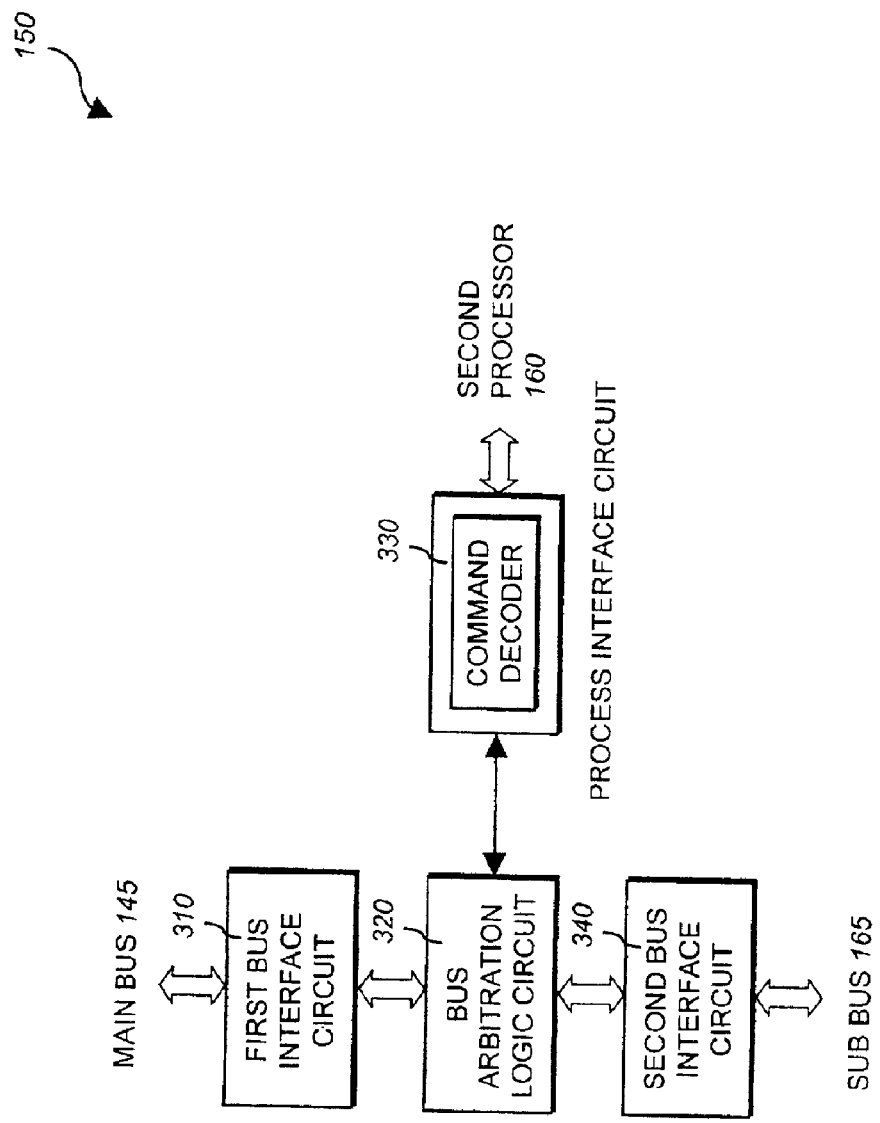
FIG. 3 is a diagram illustrating a bus controller shown in FIG. 1 according to one embodiment of the invention.

FIG. 3 is a diagram illustrating the bus controller 150 shown in FIG. 1 according to one embodiment of the invention. The bus controller 150 includes a first bus interface circuit 310, a bus arbitration logic circuit 320, a processor interface circuit 330, and a second bus interface circuit 340.

The first bus interface circuit 310 interfaces to the main bus 145. The first bus interface circuit 310 may include bi-directional bus drivers with tri-state capability. The first bus interface circuit 310 may also include circuit to convert signals from the sub bus 165 to the main bus 145, or vice versa.

The bus arbitration logic circuit 320 arbitrates access requests from the first and second processors 110 and 160. The arbitration may be based on some prioritization scheme, either static or dynamic, when two processors compete for the same bus, e.g., the sub bus 165. When the first processor 110 accesses the main bus 145 and the second processor 160 accesses the sub bus 165, there is no need for arbitration, and the bus arbitration logic circuit 320 needs only enable or disable the appropriate bus interface circuits.

The processor interface circuit 330 interfaces to the second processor 160. The processor interface circuit 330 includes a command decoder 335. The command decoder 335 decodes a command sent from the second processor 160, and informs the bus arbitration logic circuit 320. The command may be an access request to the main bus 145 or the sub bus 165.

The second bus interface circuit 340 interfaces to the sub bus 165. The second bus interface circuit 340 may include bi-directional bus drivers with tri-state capability. The second bus interface circuit 340 may also include circuit to convert signals from the main bus 145 to the sub bus 165, or vice versa.

By having the two bus interface circuits 310 and 340, the bus controller 150 may act as a bus separator to separate the main bus 145 and the sub bus 165 so that one processor can access one bus while the other processor accesses the other bus. This concurrent processes improve the efficiency of the bus utilization. When more buses or more processors are involved, the bus controller 150 may contain more bus and processor interface circuits, or multiple bus controllers may be used.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. An apparatus comprising:
   first and second bus interface circuits to interface to first and second buses, respectively, the first bus being accessible to a first processor;
   a processor interface circuit to interface to a second processor, the second processor having accessibility to the first and second buses; and
   an arbitration logic circuit coupled to the first and second bus interface circuits and the processor interface circuit to arbitrate access request from the first and second processor; wherein the arbitration logic circuit disables the first bus interface circuit when the second processor requests access to the second bus.

2. The apparatus of claim 1 wherein the second processor is coupled to the first and second buses.

3. The apparatus of claim 2 wherein the processor interface circuit comprises:
   a command decoder to decode an access command from the second processor requesting access to one of the first and second buses.

4. The apparatus of claim 1 wherein the arbitration logic circuit enables the first and second bus interface circuits when access request to the second bus from the first processor is granted.

5. The apparatus of claim 1 wherein the arbitration logic circuit resolves access requests from the first and second processors such that the first processor accesses the first bus while the second processor accesses the second bus.

6. The apparatus of claim 1 wherein the first processor is one of a microprocessor, a micro-controller, and a digital signal processor.

7. The apparatus of claim 1 wherein the second processor is a direct memory access (DMA) controller.

8. The apparatus of claim 1 wherein the first and second buses are of same type.

9. The apparatus of claim 1 wherein the first and second buses are of different types.

10. A method comprising:
    interfacing to first and second buses by first and second interface circuits, respectively, the first bus being accessible to a first processor;
    interfacing to a second processor, the second processor having accessibility to the first and second buses; and
    arbitrating access requests from the first and second processors; wherein arbitrating access requests comprises disabling the first bus interface circuit when access request to the second bus from the second processor is granted.

11. The method of claim 10 wherein the second processor is coupled to the first and second buses.

12. The method of claim 11 wherein interfacing to the second processor comprises:
    decoding an access command from the second processor requesting access to one of the first and second buses.

13. The method of claim 10 wherein arbitrating access requests comprises enabling the first and second bus interface circuits when access request to the second bus from the first processor is granted.

14. The method of claim 10 wherein arbitrating access requests comprises resolving the access requests from the first and second processors such that the first processor accesses the first bus while the second processor accesses the second bus.

15. The method of claim 10 wherein the first processor is one of a microprocessor, a micro-controller, and a digital signal processor.

16. The method of claim 10 wherein the second processor is a direct memory access (DMA) controller.

17. The method of claim 10 wherein the first and second buses are of same type.

18. The method of claim 10 wherein the first and second buses are of different types.

19. A system comprising:
    first and second buses;
    first and second processors, the first processor being coupled to the first bus;
    a bus controller coupled to the first and second buses to control bus access from the first and second processors, the bus controller comprising:
       first and second bus interface circuits to interface to the first and second buses, respectively,
       a processor interface circuit to interface to the second processor, the second processor having accessibility to the first and second buses, and
       an arbitration logic circuit coupled to the first and second bus interface circuits and the processor interface circuit to arbitrate access request from the first and second processor; wherein the arbitration logic circuit disables the first bus interface circuit when the second processor requests access to the second bus.

20. The system of claim 19 wherein the second processor is coupled to the first and second buses.

21. The system of claim 20, wherein the processor interface circuit comprises:
    a command decoder to decode an access command from the second processor requesting access to one of the first and second buses.

22. The system of claim 19 wherein the arbitration logic circuit enables the first and second bus interface circuits when access request to the second bus from the first processor is granted.

23. The system of claim 19 wherein the arbitration logic circuit resolves access request from the first and second processors such that the first processor accesses the first bus while the second processor accesses the second bus.

24. The system of claim 19 wherein the first processor is one of a microprocessor, a micro-controller, and a digital signal processor.

25. The system of claim 19 wherein the second processor is a direct memory access (DMA) controller.

26. The system of claim 19 wherein the first and second buses are of same type.

27. The system of claim 19 wherein the first and second buses are of different types.

* * * * *